(12) United States Patent
Cartaxo et al.

(10) Patent No.: US 7,715,729 B2
(45) Date of Patent: May 11, 2010

(54) APPARATUS AND METHOD FOR GENERATING AN OPTICAL SINGLE SIDEBAND SIGNAL

(75) Inventors: Adolfo Cartaxo, Feijó (PT); Daniel Fonseca, Lisbon (PT); Paulo Monteiro, Ilhavo (PT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 375 days.

(21) Appl. No.: 10/593,415

(22) PCT Filed: Jan. 4, 2006

(86) PCT No.: PCT/EP2006/050035

§ 371 (c)(1),
(2), (4) Date: Jul. 17, 2007

(87) PCT Pub. No.: WO2006/077176

PCT Pub. Date: Jul. 27, 2006

(65) Prior Publication Data

US 2008/0002989 A1    Jan. 3, 2008

(30) Foreign Application Priority Data

Jan. 20, 2005   (EP)   ................... 05001145

(51) Int. Cl.
*H04B 10/04*   (2006.01)

(52) U.S. Cl. .................. 398/183; 398/188; 398/175; 398/176

(58) Field of Classification Search ............. 398/182, 398/183, 185, 186, 188, 192, 194, 195, 198, 398/200, 201, 161, 102, 85, 79, 82, 90, 176, 398/162, 175, 180
See application file for complete search history.

(56) References Cited

U.S. PATENT DOCUMENTS 5,301,058 A * 4/1994 Olshansky .................. 398/194
6,525,857 B1 * 2/2003 Way et al. .................... 398/192
6,661,976 B1   12/2003 Gnauck et al.

OTHER PUBLICATIONS

M. Sieben, et al., "Optical single sideband transmission at 10 Gb/s using only electrical dispersion compensation," IEEE Journal of Lightwave Technology, vol. 17, No. 10, Oct. 1999, pp. 1742-1749.
K. Powers' article, "The compatibility problem in single-sideband transmission," Proc. IRE, vol. 48, pp. 1431-1435, Aug. 1960.

* cited by examiner

*Primary Examiner*—Hanh Phan
(74) *Attorney, Agent, or Firm*—Dickinson Wright PLLC

(57) ABSTRACT

A single sideband signal is generated from an input optical signal. An optical phase modulator performs optical phase modulation on the input optical signal in accordance with a control signal to produce the single sideband signal. A converter converts the input optical signal into a corresponding electrical signal. A control signal generator generates the control signal in response to an optical signal pulse shape of the input optical signal.

16 Claims, 6 Drawing Sheets

PRIOR ART

PRIOR ART

APPARATUS AND METHOD FOR GENERATING AN OPTICAL SINGLE SIDEBAND SIGNAL

CROSS REFERENCE TO RELATED APPLICATIONS

This application is the US National Stage of International Application No. PCT/EP2006/050035, filed Jan. 4, 2006 and claims the benefit thereof. The International Application claims the benefits of European Patent application No. 05001145.1 filed Jan. 20, 2005. All of the applications are incorporated by reference herein in their entirety.

Field of the Invention

The present invention is concerned with optical single sideband (OSSB) transmission and, more particularly, to wave division multiplexing (WDM) SSB signals.

Background of the Invention

Single sideband (SSB) offers some convincing advantages over conventional double sided transmission. In conventional optical modulation formats, two information sidebands are transmitted, commonly referred to as optical double sideband (ODSB) transmission. By contrast, optical single sideband (OSSB) signals suppress one of the sidebands in order to reduce the frequency occupation of the transmitted signal.

The situation will be better understood by comparing the single sideband of FIG. 1a to that of the double sideband transmission of FIG. 1b. As can be seen, the SSB signals 102 in FIG. 1a require half of the bandwidth of that of the double sided signals 104 in FIG. 1b. In other words, the spectral occupancy of the SSB signals is effectively halved in the SSB case, thereby doubling the number of transmitted channels available as compared with conventional systems.

Another reason to utilize SSB, which is not readily seen from these figures, is that OSSB signals have higher tolerance to chromatic dispersion introduced by the optical transmission fiber. In addition, OSSB signal technology provides efficient electrical equalization at the receiver side due to phase conservation after optical signal detection. Given these grounds, it is easy to explain why SSB is a chief method of transmission.

Not surprisingly, this has led to the development of the field of generating an OSSB signal. Two different approaches concern us here. The first is the use of an optical configuration and electrical signals that produce the desired optical signal. The second is the use of an optical filter with a detuned central frequency. In the first situation, a complete optical transmitter would be required, composed of an optical source and an external modulator device. However, providing an entire optical transmitter and modulator is quite costly, if not impractical. In the second, the optical signal may be generated by a third party or remote equipment owing to the fact that the undesired optical sideband is suppressed in the optical domain. However, as we shall see, suppressing the sideband without distortion in the optical domain is not so easily achieved.

Further, one must keep in mind whilst preparing the SSB signal that the signal will likely be transmitted via wavelength division multiplexing (WDM). WDM increases the carrying capacity of the physical medium (fiber) by assigning incoming optical signals to specific frequencies of light (wavelengths, or lambdas) within a certain frequency band. In a WDM system, each of the wavelengths is launched into the fiber, and the signals are demultiplexed at the receiving end. Further, each WDM channel has its own dedicated bandwidth, meaning that all signals arrive at the same time, rather than being broken up and carried in time slots.

Given the savings of bandwidth that is already achievable with SSB signals, it would be clearly an advantage to transmit SSB signals via WDM. However, in order to do this the optical signals must have SSB properties before multiplexing (or, at least, have SSB properties due to the multiplexing process). Three known techniques have been proposed for this purpose. It has been proposed, for example, to optically generate the signal with SSB properties at the transmitter equipment. Another proposal has been to provide that the WDM equipment converts the incoming optical signal to the electrical domain and use a complete optical transmitter to generate the optical signal with the SSB properties. Finally, it has been put forth to detune the optical multiplexer in relation to the central wavelength of each optical channel.

The first technique above requires the use of dedicated transmitter equipment for WDM systems that are specially designed for such purpose. The second technique is less cost effective as we are doubling the required number of optical transmitters. The third technique is highly cost effective, although the properties of the SSB signal, namely the amount of suppression of the undesired sideband and eye pattern distortion introduced, depend strongly on the characteristics of the used optical filter.

The problems with the third technique will be brought to light with reference to FIGS. 2a and 2b. In both of these figures, an optical input signal 202 is filtered using a detuned filtering characteristic 204. It is known that, when the filter is detuned, the filtering characteristic has a better opportunity to track the input optical signal. However, as can be seen, a distortion in the characteristics causes the filtered signal, the resulting SSB signal 206 to be improperly filtered. The result is an SSB signal that is inadequate in practice.

Henmi, U.S. Pat. No. 5,227,908, discloses such a device, reproduced here in FIG. 3, to suppress one of the sidebands using an optical filter. More particularly, Henmi's transmitting side 300 is responsible for the SSB suppression and it is this section that forms the focus of the instant discussion. Briefly, a semiconductor laser 301 oscillates at a carrier light frequency by a d.c. injection current from a d.c. biasing source 302. An output light 304 is modulated by an external modulator 305 driven by a transmitting signal inputted from a terminal 303 and, after being passed through an optical filter 307 which serves to suppress the side-band signal component, the light 306 becomes a transmitting signal light 308.

However, the Henmi device has also proven deficient in providing an SSB signal that accurately represents the information in the input optical signal. It is postulated that the reason lies in the fact that the Henmi device, i.e., section 300, generates the SSB signal within the optical domain. Optical filtering, as proposed by Henmi, is unable to obtain a good suppression of one sideband without attenuating the optical carrier. The performance of the technique proposed by NEC depends highly on the filter characteristics, namely of the decay rate.

This is clearly illustrated by FIGS. 4a-4c. In FIG. 4a, a large number of channels 402 share an optical fiber to the extent that the individual signals overlap resulting in crosstalk. This may occur, for example, in a WDM system that is dense, e.g., 40 Gb/s channels with 50 GHz frequency spacing, when a broadband optical multiplexer is used to aggregate the optical signals. When cross talk occurs 404, it is not possible to filter the combined channel. This can be seen from FIG. 4b where the filters 406 intersect neighboring channels. This results in the multiplexed signal 408 shown in FIG. 4c, which has limited overall performance.

Systems such as those proposed by Henmi suffer from such consequences. One problem with such a solution is the precision required for the optical multiplexer and possible differences between the detuned frequency of the multiplexer and the channel optical carrier frequencies (due to temperature stability, etc).

It would be advantageous, therefore, to provide an OSSB signal that accurately represents the input optical signal. It is lacking in the art to provide a filter that accurately suppresses one side band of the input optical signal. Heretofore, there is not provided a means to accurately single sideband filter an input optical signal taking into account the cross talk appearing due to the combination of several signals in a multiplexed signal.

SUMMARY OF THE INVENTION

A single sideband signal (504) is generated from an input optical signal (502). An optical phase modulator (508) performs optical phase modulation on the input optical signal (502) in accordance with a control signal (520) to produce the single sideband signal (504). A converter (512) converts the input optical signal (502) into a corresponding electrical signal. A control signal generator (514, 516) generates the control signal (520) in response to an optical signal pulse shape of the input optical signal (502).

A single sideband signal is generated from an input optical signal by converting a portion of the input optical signal and converting such portion to an electrical signal. The electrical signal is used to generate a control signal on the basis of an optical signal pulse shape of the input optical signal. Finally, an optical phase modulation of the input optical signal is applied, based on the control signal.

An aim in the invention is to provide an adequately filtered OSSB signal for wave division multiplexing.

In a particular aspect of the invention, the control signal is generated using a phase shifting transform, such as the Hilbert transform.

An advantage of this method and apparatus is that the optical signal is modulated in the optical domain on the basis of a control signal developed in the electrical domain. In other words, the optical signal is modulated without "completely" converting it into electrical form. This allows converting optical double sideband signals to single sideband signals without converting the original signal to the electrical domain, which may distort the signal.

The filter of the present invention advantageously adapts to the shape of the incoming optical signal. It shall be appreciated that the exemplary filter illustrated here applies particularly to intensity modulated signals. This is because the chosen filter filters power signals, mathematically expressed in terms of a square root formulation in the equation. This should be no problem in practice as generally most signals are intensity modulated. In any event, another filter may be employed with the basic concept of the invention thereby obtaining the previous advantages for any signal shape. This means that the suppression is verified for optical signals with any optical bandwidth and spectrum shape. Using fixed optical filters, the suppressed power in one of the sidebands changes according to the used pulse shapes. However, in the case of the proposed filter, a replica of the original pulse shape in the electrical domain is obtained, and the invention generates therefrom an electrical signal to suppress the sideband according to the original pulse shape. In this way, the invention is said to adapt to the optical pulse shape.

A further advantage is that no amplitude distortion is introduced in the optical signals when direct detection systems are used.

Another advantage of the invention is that the optical bandwidth is reduced to half, doubling the number of channels in WDM systems.

In addition, the OSSB signals are more tolerant to chromatic dispersion introduced by transmission in the optical fiber and allow electrical dispersion compensation. A full appreciation of the dispersion effect can be ascertained from the article by M. Sieben, et al., "Optical single sideband transmission at 10 Gb/s using only electrical dispersion compensation", IEEE Journal of Lightwave Technology, vol. 17, n° 10, October 1999, pp. 1742-1749.

BRIEF DESCRIPTION OF THE DRAWINGS

The following figures illustrate at least one example of the present invention.

DETAILED DESCRIPTION OF THE INVENTION

Figure 1A:
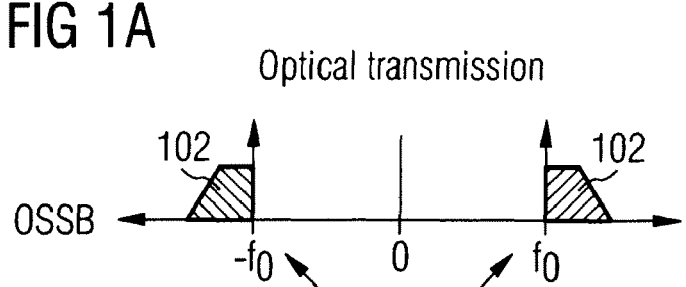
FIGS. 1a and 1b illustrate SSB and DSB, respectively.
Figure 1B:
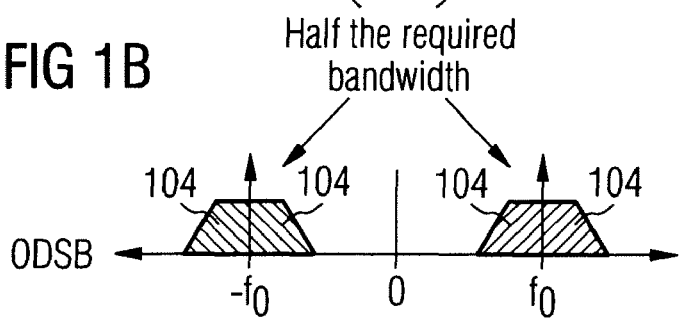
Figure 2A:
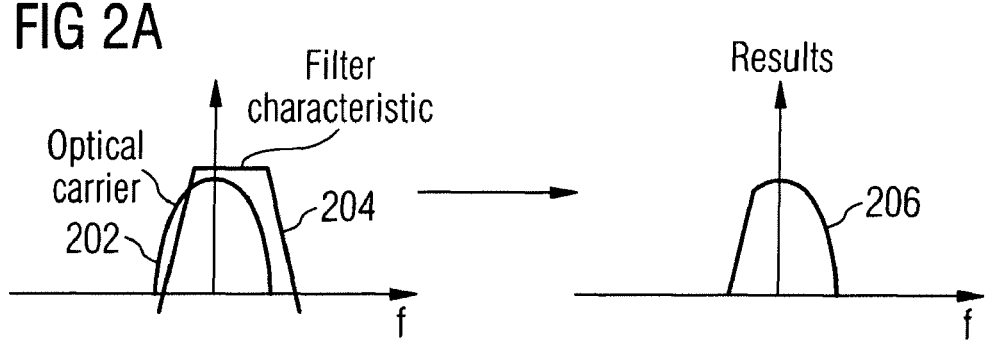
FIGS. 2a and 2b illustrate detuned filtering.
Figure 2B:
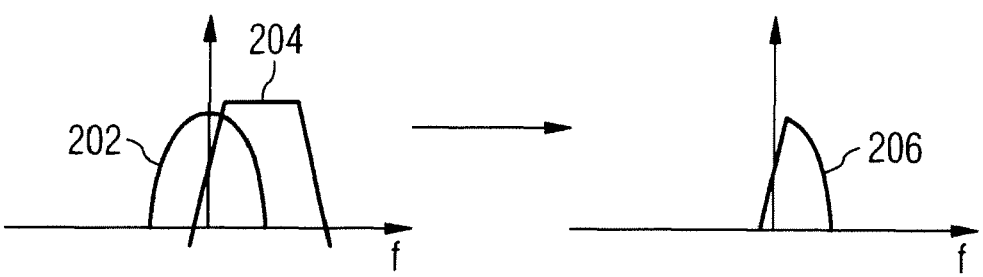
Figure 3:
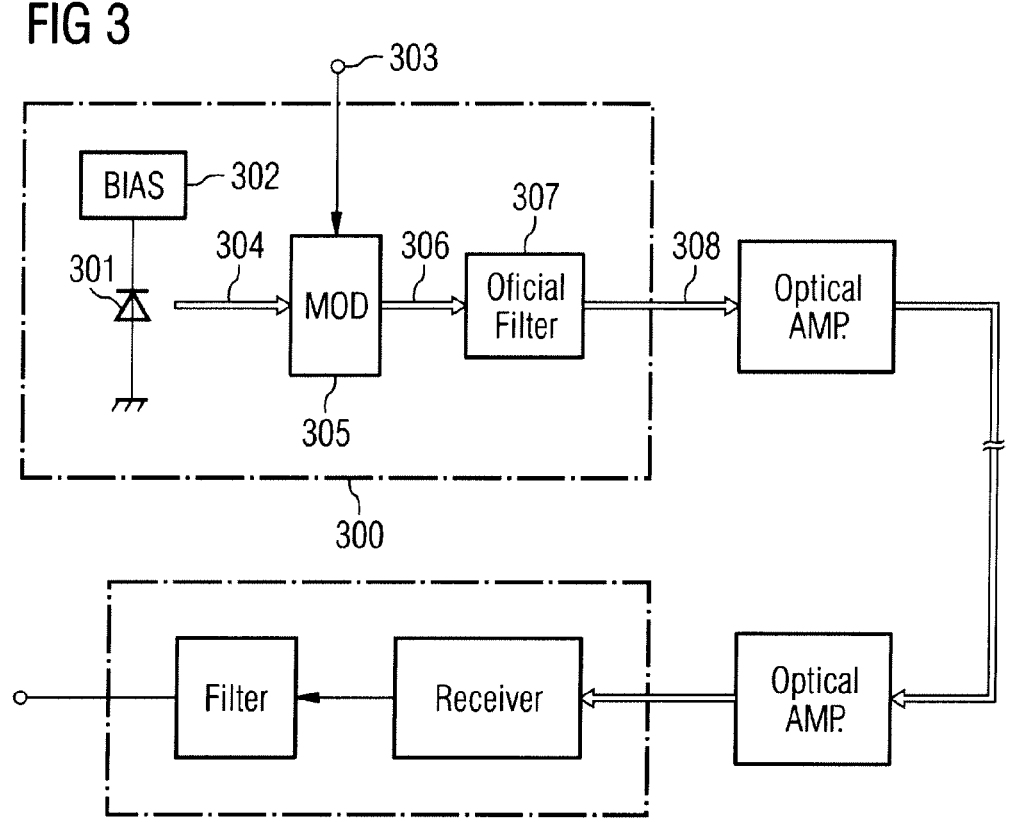
FIG. 3 illustrates an antiquated SSB filter.
Figure 4A:
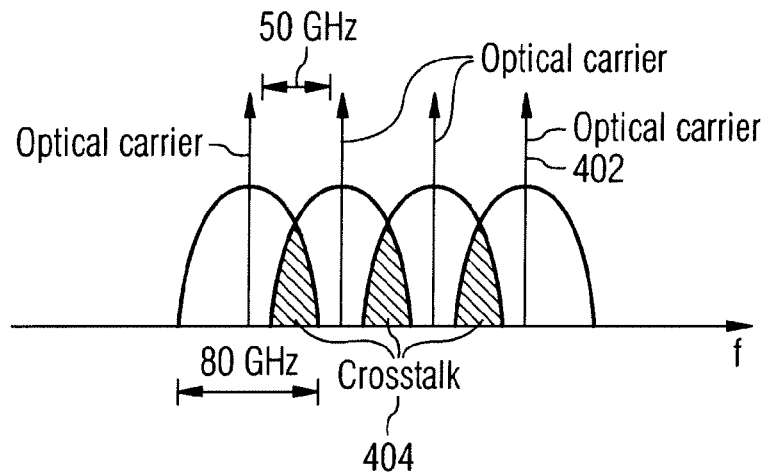
FIGS. 4a-4c illustrate the effects of crosstalk.
Figure 4B:
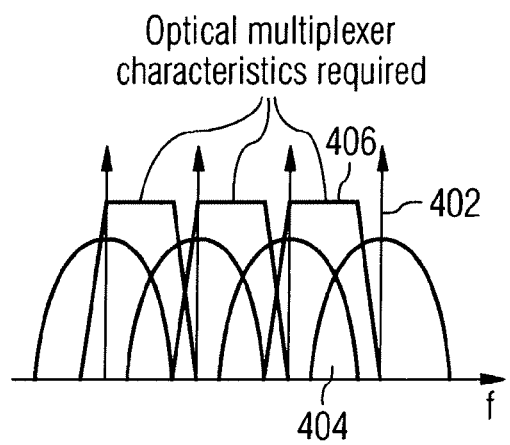
Figure 4C:
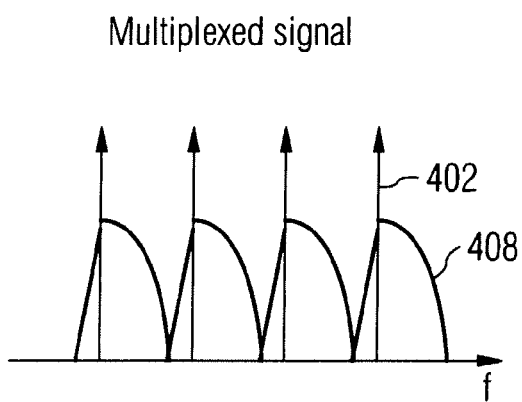
Figure 5A:
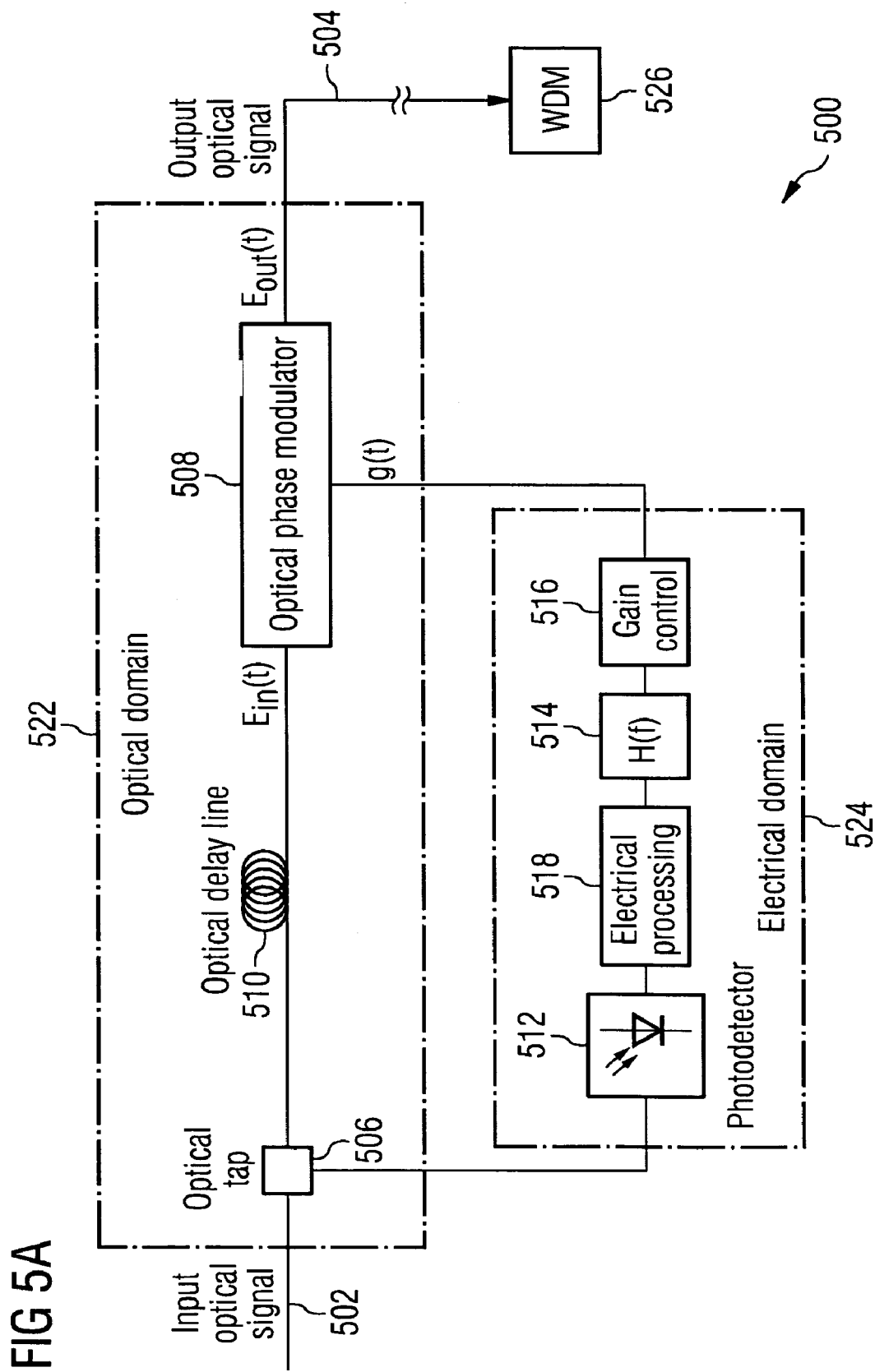
FIGS. 5a and 5b illustrate the present invention.

The proposed configuration for the adaptive optical filter 500 of the present invention to convert an input optical signal 502 to obtain the OSSB signal 504 is presented in FIG. 5a. The input optical signal 502 is fed to a splitter, such as the optical tap 506, that diverts a portion of the power of the input optical signal. The portion not diverted is optically phase modulated in the optical domain by an optical phase modulator 508. An optical delay line 510 may optionally be inserted in order to take into account element delays in the electrical processing.

To continue, a photodetector 512 converts the portion of the power diverted by the optical tap 506 into an electrical signal. The photodetector 512 may be a photo-electric diode, for example. Using the photo-diode, the electrical signal traces the carrier signal of the input optical signal, thereby producing the envelope, or information signal of the optical signal.

The converted electrical signal is then utilized to generate a filtering control signal that tracks the shape required to obtain the single sideband of the input optical signal. In this case, the present invention employs a phase shifting type transform. In one aspect of the invention, the Hilbert transform was found to have advantageous characteristics that provide excellent tracking of the shape of the optical signal. A gain control element 516 sets the correct bias and modulation voltages based on the input requirements of the optical phase modulator. In a variant of the invention, there is further provided an electrical processing unit 518 that serves to reshape the converted electrical signal.

The invention may be considered to have two separate portions, or domains. The optical domain 522 processes that portion of the input optical signal in the optical domain, whereas the electrical domain 524 processes that portion of the signal converted into an electrical signal in the electrical domain.

While not the primary part of the invention, one aim of the invention is to prepare the OSSB signal for WDM processing.

To that end, and for completeness, there is shown a WDM component 526 that WDM multiplexes the OSSB signal 504.

Now that the physical layout of FIG. 5*a* has been described, the operation of the invention will now be set forth in reference to the elements shown. The optical input signal 502 is split by the optical tap 506 into two components. In one aspect a portion of the power spectrum is diverted. One of these power components is forwarded to the optical phase modulator 508. The other component is sent to the photodetector 512.

The output electrical field of the optical phase modulator, expressed by $E_{out}(t)$, can be represented by:

$$E_{out}(t) = E_{in}(t) \cdot \exp[j \cdot g(t)] \quad (1)$$

where t is the time and g(t) is the electrical drive signal. $E_{in}(t)$ is the electrical input signal in the optical phase modulator. Optical phase modulators are currently available in the market and the specifics of which will not be herein described.

Using the optical delay line 510 adjusted to the particular electrical components may account for possible delays in the electrical domain 524. This optical delay takes account of non-ideal components that are not perfect in the real world in order to align the optical signal with the electrical signal.

The photodetector 512 converts the optical signal to the electrical domain. The electrical signal represents the information signal of the input optical signal. This may be accomplished using a photodiode that tracks the envelope of the input optical signal.

As already mentioned, the converted electrical signal may need to be reshaped. If the converter is non-linear, for example, it will alter the shape of the signal. In order to obtain the expected shape of the signal, the electrical analog processor 518 is provided. Normally, the signal expected is logarithmic and, thus, the electrical processor 518 utilizes a logarithmic function. This may be given by the following logarithmic function f(x):

$$f(x) = 0.5 \cdot \log(x) \quad (2)$$

where x is the electrical signal at the output of the photodetector. This response can be obtained by a nonlinear electrical amplifier. Two alternative electrical analog processors are shown further in this document.

After the electrical processing, the phase shifting transform function is applied to the converted electrical signal. In the preferred mode, the transform is an electrical Hilbert filter (514). In terms of equation (2), the Hilbert filter is used to obtain the Hilbert transform of f(x). The response of the proposed invention is adaptive, as the response of the complete configuration presented in FIG. 5 *a* depends on the optical signal pulse shape.

The gain control block 516 then corrects bias and modulation voltages of the filtered electrical signal that are to be applied to the optical phase modulator. Since these are based on the specific physical requirements of the optical phase modulator, this is left to the skilled practitioner to determine from the product literature.

In more detail, the transform selected for the invention is of the phase shift type. Essentially, there are three methods in order to suppress power. These are the phase shift method, detuned filtering and the known Weavers method. The invention has determined that the phase shift method has advantages over the others. One reason for this is that the Hilbert transform suppresses spectrum components.

The advantages of the Hilbert transform will be better understood with reference to K. Powers' article, "The compatibility problem in single-sideband transmission", Proc. IRE, vol. 48, pp. 1431-1435, August 1960, which describes how the phase modulation introduced suppresses one sideband. In distinction to the present invention, Powers does not recognize the potential for using the Hilbert transform for suppressing optical sidebands. Clearly, Powers nowhere describes how a Hilbert transform could be applied to the optical field.

In essence, Powers reveals that undistorted detection of "standard" SSB signals is impossible using conventional envelope detectors. While Powers discusses in detail what causes the distortion, we will not delve into the mathematical analysis here but defer to the cited text. Consider α(t) the electrical field envelope modulated with the information signal, where t is time. In order to resolve the identified problems, Powers theorizes that sideband suppression is achieved by introducing a phase modulation to α(t). The required phase is given by a signal in quadrature to the logarithm of α(t). Powers expresses this mathematically according to the following expression (3):

$$\psi(t) = \alpha(t) \exp\left[\frac{i}{\pi} \int_{-\infty}^{\infty} \frac{\log \alpha(\mu)}{t - \mu} d\mu\right] \quad (3)$$

The above expression indicates that the envelope ψ(t) may be detected without distortion from the information that has been transported in the signal α(t) as a factorial of the modulating function performed by the exponential function. In other words, the optical phase modulation is performed by the exponential. Based on this, Powers postulates that distortionless detection of the envelope may be obtained using a square-law detector. The signal in quadrature to the logarithm of α(t) is provided by the Hilbert transform of logarithm of α(t). The Hilbert transform of logarithm of α(t) is represented by the expression inside the brackets, removing i (the i is used to obtain only a phase modulation). The Hilbert transform of a signal x(t), HT[x(t)], is given by:

$$HT[x(t)] = \frac{1}{\pi} \int_{-\infty}^{\infty} \frac{x(\mu)}{t - \mu} d\mu \quad (4)$$

In expression (4), the integrating order is μ. The use of the integral and the term $1/[\pi \cdot (t-\mu)]$ are related with the Hilbert transformation. x(μ) is the signal to be transformed by the Hilbert transformer.

As mentioned before, two alternative electrical analog processors can be applied in order to obtain sideband suppression using phase modulation. Both are based on a phase modulation proposed by Villard [see S. Hahn, "Hilbert transforms in signal processing", Artech House Publisher, Boston, 1996.]. The envelope ψ(t), obtained using such phase modulation, is given by:

$$\psi(t) = \alpha(t) \cdot \exp[i \cdot HT(\alpha(t))] \quad (5)$$

In this case, complete sideband suppression is unattained, as expression (5) is based on mathematical approximations of Taylor expansions. The first alternative processor makes use of the non-linear function f(x), given by:

$$f(x) = \sqrt{\frac{x}{\bar{x}}} \quad (6)$$

where $\bar{x}$ is the mean value of x. With the proper setting of the gain control block, the envelope described by (5) is obtained. The second alternative processor makes use of the assumption that the square of α(t) has a similar shape to α(t). As an example, the square of a rectangular pulse with amplitude 1 is still a rectangular pulse with amplitude 1. Under this assumption, the third alternative processor makes use of the function f(x), given by:

$$f(x) = \frac{x}{\bar{x}} \quad (7)$$

The invention does not blindly follow the Powers theorem or, for that matter, theorem's that may be alternatively used with the invention such as the Villard theorem) but modifies his theorem according to the specific arrangement of the invention. In the case of the invention, α(t) is the electrical field envelope modulated with the information, present in the input of the proposed apparatus. Portion of the power present at the input of the invention is extracted to the electrical control circuit. At the input of the electrical control circuit, the square-law detector squares the electrical field, which is a portion of the total power at the input of the proposed apparatus. In order to account for this, we take the square root of the electrical signal using the function f(x), given by (2).

Figure 5B:
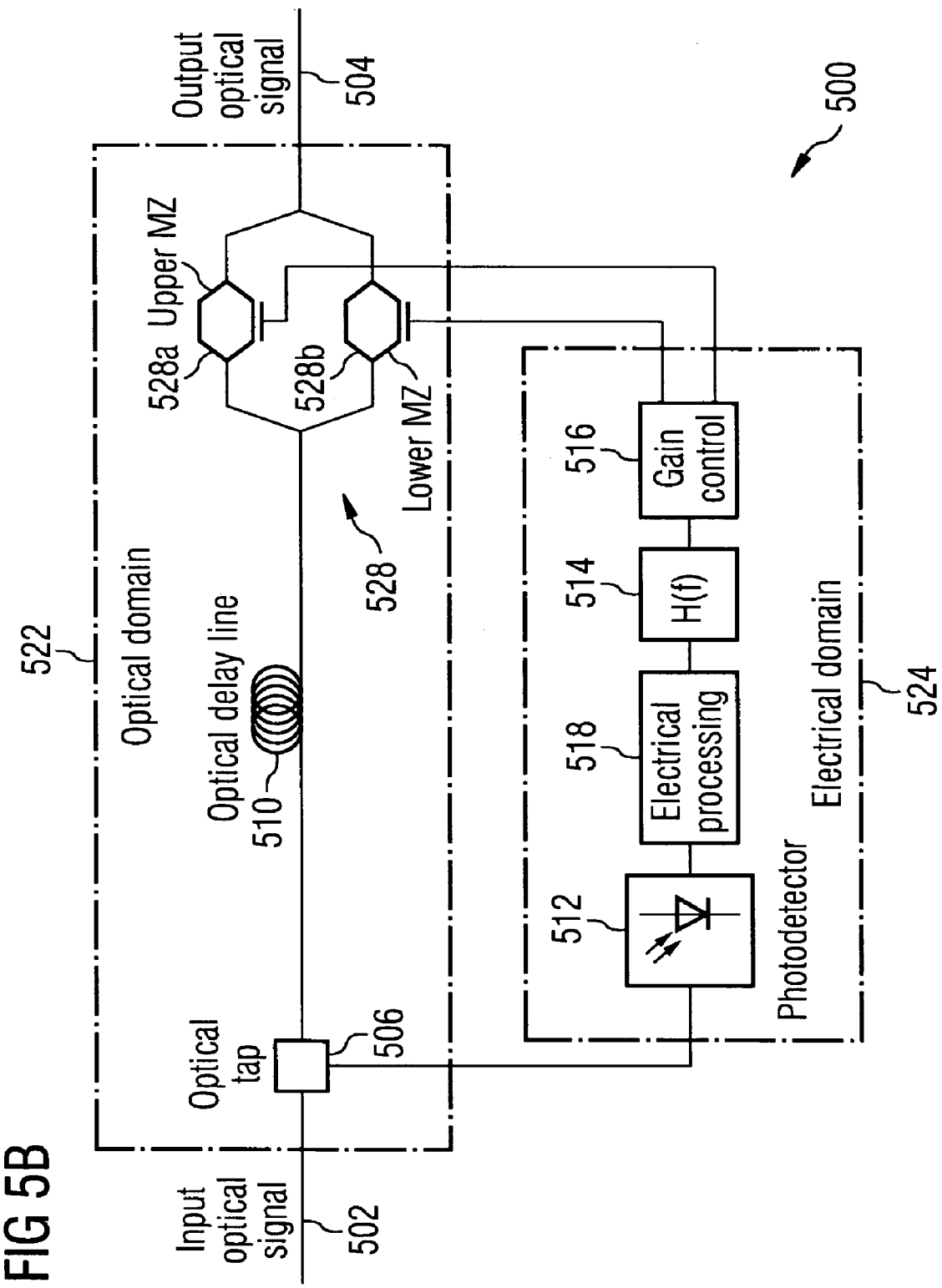

An alternative configuration in the present invention is shown in FIG. 5b. In this case, FIG. 5b is similar to the situation in FIG. 5a. Here, the phase modulation is performed by the structure 528 with two Mach-Zehnders 528a, b in parallel. The optical field at the output is given by:

$$E_{out}(t) = E_{in}(t) \cdot \exp[j \cdot g(t)] = E_{in}(t) \cdot \{ \cos [g(t)] + j \sin [g(t)] \} \quad (8)$$

The term cos [g(t)] can be obtained at the output of the upper Mach-Zehnder (MZ) and j sin [g(t)] can be obtained at the output of the lower MZ. While this may be easier to implement mathematically, the configuration presented here is more complex compared with the configuration presented in FIG. 5a.

With the present invention thus far described, an OSSB signal may be obtained without distortion. As understood from the above, particularly with respect to FIGS. 5a and 5b, the optical SSB signal is obtained without converting the complete input optical signal to the electrical domain. This allows converting optical double sideband signals to single sideband signals without converting the original signal to the electrical domain.

Further, no amplitude distortion is introduced in the optical signals when direct detection systems are used. This can be verified by applying the square-law detection to the output electrical signal, given by expression (9) here:

$$|E_{out}(t)|^2 = |E_{in}(t) \cdot \exp[j \cdot g(t)]|^2 = |E_{in}(t)|^2 \quad (9)$$

As heretofore mentioned the optical bandwidth is reduced to half, doubling the number of channels in WDM systems by virtue that the invention employs SSB. It was also mentioned that the OSSB signals are more tolerant to chromatic dispersion introduced by transmission in the optical fiber and allow electrical dispersion compensation.

The proposed filter adapts to the shape of the incoming optical signal, obtaining the previous advantages particularly to those signals belonging to intensity modulated signals. This means that the suppression is verified for optical signals and, particularly for intensity modulated optical signals with any optical bandwidth and spectrum shape.

It will also be appreciated from the above that the invention adapts to different shapes of the input optical signal. Distinct pulse shapes can be used to modulate the information into an optical carrier. The occupied bandwidth of the modulated optical signal changes according to these pulse shapes.

Figure 6A:
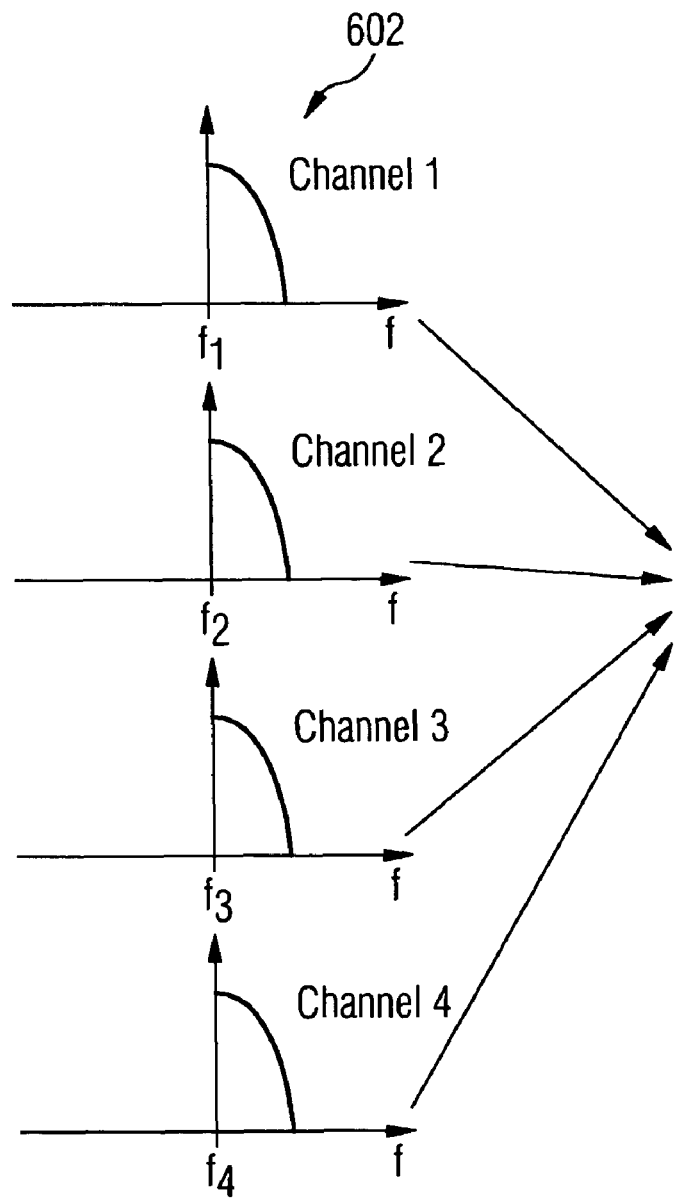
FIGS. 6a and 6b illustrate an example of filtering using the present invention.
Figure 6B:
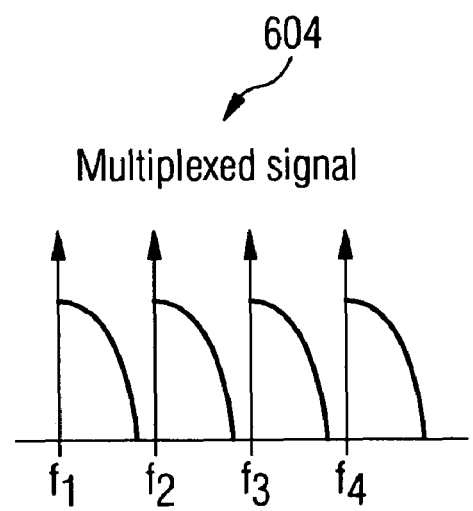

In addition, the invention solves the fore-mentioned problems of crosstalk. This is shown in FIGS. 6a and 6b, wherein the invention is applied to individual channels (1-n) of the present invention as generally indicated by reference numeral 602. As can be seen using the present invention, the multiplexed output signals (f1-f4) 604 are accurately SSB filtered. The proposed invention can be applied to the individual optical channels at the input of the dense WDM equipment and a broadband multiplexer can be used to aggregate the channels without distortion.

Although the present invention has been described with reference to particular embodiments, it shall be appreciated that modifications to the invention may be practiced within the spirit and scope of the invention.

The invention claimed is:

1. An apparatus for generating a single sideband signal from an input optical signal, comprising:
    an optical phase modulator that optically phase modulates the input optical signal in accordance with a control signal to produce the single sideband signal;
    a converter that converts a portion of the input optical signal into a corresponding electrical signal; and
    a control signal generator that generates the control signal in response to an optical signal pulse shape of the input optical signal represented in the portion of the input optical signal converted into the electrical signal.

2. The apparatus according to claim 1, further comprising an electrical analog processor, wherein the electrical analog processor comprises the following function:

$$f(x) = 0.5 \cdot \log(x)$$

where, x represents the converted electrical signal.

3. The apparatus according to claim 1, further comprising an electrical analog processor, wherein the electrical analog processor comprises the following function:

$$f(x) = \sqrt{\frac{x}{\bar{x}}}$$

where x represents the converted electrical signal and $\bar{x}$ is the mean value of x.

4. The apparatus according to claim 1, further comprising an electrical analog processor, wherein the electrical analog processor comprises the following function:

$$f(x) = \frac{x}{\bar{x}}$$

where x represents the converted electrical signal and $\bar{x}$ is the mean value of x.

5. The apparatus according to claim 1, wherein a wavelength division multiplexor multiplexes the single sideband signal according to a wavelength division.

6. The apparatus according to claim 1, wherein the optical phase modulator modulates the input optical signal suppressing optical power on at least one of the sidebands of the input optical signal.

7. The apparatus according to claim 1, wherein the control signal generator comprises a phase shift transform function.

8. The apparatus according to claim 1, wherein the control signal generator comprises a Hilbert transform function.

9. The apparatus according to claim 1, wherein the control signal generator comprises an electrical analog processor that reshapes the electrical signal into a shape compatible with the control signal generator.

10. The apparatus according to claim 1, wherein a delay is introduced before the optical phase modulator that accounts for a delay in the electrical signal due to electrical component delays.

11. The apparatus according to claim 1, wherein an optical tap diverts a portion of the input optical signal power to the converter.

12. A method for generating a single sideband signal from an input optical signal, comprising:

converting a portion of the input optical signal into an electrical signal that corresponds to the input optical signal;

generating a control signal based on an optical signal pulse shape represented in the portion of the input optical signal converted to the electrical signal; and optically phase modulating the input optical signal based on the control signal.

13. The method according to claim 12, wherein a Hilbert transform is utilized to track the shape of the input optical signal.

14. The method according to claim 12, further comprising tapping a portion of the power signal of the input optical signal.

15. The method according to claim 12, wherein the optical phase modulation further comprises a wavelength division multiplexing of the input optical signal.

16. The method according to claim 12, further comprising, detuning the optical phase modulation relative to the center frequency of the input optical signal.

* * * * *